US012593946B2

(12) United States Patent
Metcalf et al.

(10) Patent No.: US 12,593,946 B2
(45) Date of Patent: Apr. 7, 2026

(54) VACUUM FOR USE WITH MODULAR STORAGE SYSTEM

(71) Applicant: Milwaukee Electric Tool Corporation, Brookfield, WI (US)

(72) Inventors: Christopher J. Metcalf, Wauwatosa, WI (US); Timothy Tin Pak Lee, Kwai Chung (HK); Fraizier Reiland, Myrtle Beach, SC (US); Jonathan M. Mantes, Franklin, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 1027 days.

(21) Appl. No.: 17/079,022

(22) Filed: Oct. 23, 2020

(65) Prior Publication Data

US 2021/0121029 A1 Apr. 29, 2021

Related U.S. Application Data

(63) Continuation of application No. PCT/US2020/057043, filed on Oct. 23, 2020.

(Continued)

(51) Int. Cl.

*A47L 9/00* (2006.01)
*A47L 5/36* (2006.01)

(Continued)

(52) U.S. Cl.

CPC ............. *A47L 9/0027* (2013.01); *A47L 5/365* (2013.01); *A47L 7/0019* (2013.01);

(Continued)

(58) Field of Classification Search

CPC .... A47L 9/0027; A47L 9/0036; A47L 9/0063; A47L 5/365; A47L 7/0019; A47L 7/0085;

(Continued)

(56) References Cited

U.S. PATENT DOCUMENTS 2,042,387 A 5/1936 Cobb
3,424,334 A 1/1969 Goltz (Continued)

FOREIGN PATENT DOCUMENTS

CN 2922757 Y 7/2007
CN 102712090 10/2012

(Continued)

OTHER PUBLICATIONS

International Search Report and Written Opinion for International Application No. PCT/US2020/057043, dated Feb. 16, 2021, 10 pages.

(Continued)

*Primary Examiner* — Michael A Gump

(74) *Attorney, Agent, or Firm* — Reinhart Boerner Van Deuren s.c.

(57) ABSTRACT

A vacuum that couples to storage units is provided. The vacuum includes a motor, an internal compartment, and an inlet and outlet that provide fluid communication between the internal compartment and an exterior of the vacuum. The vacuum includes one or more mechanisms to protect internal components from water damage and to prevent debris from escaping the internal compartment when the vacuum is being transported.

21 Claims, 13 Drawing Sheets

Related U.S. Application Data

(60) Provisional application No. 62/926,173, filed on Oct. 25, 2019.

(51) Int. Cl.
*A47L 7/00* (2006.01)
*B25H 3/02* (2006.01)

(52) U.S. Cl.
CPC .......... *A47L 9/0036* (2013.01); *A47L 9/0045* (2013.01); *B25H 3/02* (2013.01)

(58) Field of Classification Search
CPC ... B25H 3/02; F05D 2230/51; F04D 25/0673; F04D 29/4206; F04D 29/701; F04D 17/168; B65D 21/0209; B65D 21/0212; B65D 21/0213; B65D 21/00; B65D 21/0217
USPC .......... 15/339; 206/501, 503, 509, 511, 512, 206/504
See application file for complete search history.

(56) References Cited

U.S. PATENT DOCUMENTS

| | | | | |
|---|---|---|---|---|
| 5,263,223 | A | 11/1993 | Fiegel et al. | |
| 5,890,613 | A | 4/1999 | Williams | |
| 6,983,946 | B2 | 1/2006 | Sullivan et al. | |
| 7,000,287 | B2 | 2/2006 | Valentini | |
| 7,263,742 | B2 * | 9/2007 | Valentini | A47L 9/009 15/327.2 |
| D663,952 | S | 7/2012 | Crevling, Jr. et al. | |
| D664,354 | S | 7/2012 | Crevling, Jr. et al. | |
| 8,689,396 | B2 | 4/2014 | Wolfe et al. | |
| 8,740,010 | B1 | 6/2014 | Page | |
| 9,375,835 | B1 | 6/2016 | Lin | |
| 10,583,962 | B2 | 3/2020 | Brunner et al. | |
| 10,750,833 | B2 | 8/2020 | Burchia | |
| 2003/0115715 | A1 | 6/2003 | Valentini | |
| 2003/0139080 | A1 | 7/2003 | Lafragette et al. | |
| 2007/0138041 | A1 | 6/2007 | Welsh | |
| 2008/0115312 | A1 * | 5/2008 | DiPasquale | A47L 9/26 15/327.2 |
| 2008/0115318 | A1 * | 5/2008 | Phelan | A47L 9/327 15/410 |
| 2008/0271280 | A1 | 11/2008 | Tiede et al. | |
| 2011/0220531 | A1 * | 9/2011 | Meether | B62B 3/02 206/508 |
| 2011/0260588 | A1 | 10/2011 | Lin | |
| 2012/0180250 | A1 | 7/2012 | Ricklefsen et al. | |
| 2013/0007979 | A1 | 1/2013 | Wolfe et al. | |
| 2013/0031731 | A1 | 2/2013 | Hess | |
| 2013/0031732 | A1 | 2/2013 | Hess et al. | |
| 2013/0127129 | A1 | 5/2013 | Bensman et al. | |
| 2014/0215750 | A1 * | 8/2014 | Schultz | A47L 5/225 15/323 |
| 2014/0265440 | A1 | 9/2014 | Chen et al. | |
| 2014/0373306 | A1 * | 12/2014 | Tomasiak | A47L 9/127 29/402.04 |
| 2016/0235266 | A1 | 8/2016 | Tomasiak | |
| 2017/0165828 | A1 | 6/2017 | Fleischmann | |
| 2017/0166352 | A1 * | 6/2017 | Hoppe | B25H 3/022 |
| 2018/0015649 | A1 * | 1/2018 | Hutchinson | B29C 33/02 |
| 2018/0220861 | A1 * | 8/2018 | Zhang | A47L 9/2884 |
| 2019/0225371 | A1 | 7/2019 | Hoppe et al. | |
| 2019/0380549 | A1 * | 12/2019 | Liu | A47L 9/327 |
| 2020/0023383 | A1 * | 1/2020 | Grebing | B23Q 11/0046 |
| 2020/0147781 | A1 | 5/2020 | Squiers et al. | |
| 2020/0165036 | A1 | 5/2020 | Squiers et al. | |
| 2020/0245830 | A1 * | 8/2020 | Sanders | A47L 5/365 |
| 2022/0117451 | A1 * | 4/2022 | Dang | A47L 9/2884 |
| 2022/0203382 | A1 | 6/2022 | Grebing | |

FOREIGN PATENT DOCUMENTS

| | | | | |
|---|---|---|---|---|
| CN | 109414810 | | 3/2019 | |
| DE | 8912526 | | 2/1990 | |
| DE | 19750543 | | 5/1999 | |
| DE | 20218996 | U1 | 3/2003 | |
| DE | 102004063214 | | 7/2006 | |
| DE | 102011119477 | | 1/2013 | |
| DE | 202014103695 | | 10/2014 | |
| DE | 102014010378 | | 1/2016 | |
| EP | 0916302 | | 5/1999 | |
| EP | 1724069 | A2 | 11/2006 | |
| EP | 2805799 | | 11/2014 | |
| EP | 2829209 | | 1/2015 | |
| EP | 2829210 | | 1/2015 | |
| EP | 2829211 | | 1/2015 | |
| EP | 2537641 | B1 | 9/2016 | |
| EP | 2338650 | B1 | 10/2016 | |
| GB | 2211486 | | 7/1989 | |
| GB | 2330521 | A1 | 4/1999 | |
| GB | 2406331 | A1 | 3/2005 | |
| GB | 2413265 | A1 | 10/2005 | |
| WO | WO-2012062580 | A1 * | 5/2012 | A47L 9/0036 |
| WO | WO2014/125484 | | 8/2014 | |
| WO | WO2018188736 | | 10/2018 | |

OTHER PUBLICATIONS

Inter Partes Review No. 2024-01400, "Petition for Inter Partes Review of U.S. Pat. No. 11,365,026" Filed Sep. 17, 2024, 147 pages.
Exhibit 1001 in Petition for Inter Partes Review of U.S. Pat. No. 11,365,026 Filed Sep. 17, 2024, 66 pages.
Exhibit 1002 in Petition for Inter Partes Review of U.S. Pat. No. 11,365,026 Filed Sep. 17, 2024, 324 pages.
Exhibit 1003 in Petition for Inter Partes Review of U.S. Pat. No. 11,365,026 Filed Sep. 17, 2024, 139 pages.
Exhibit 1004 in Petition for Inter Partes Review of U.S. Pat. No. 11,365,026 Filed Sep. 17, 2024, 17 pages.
Exhibit 1005 in Petition for Inter Partes Review of U.S. Pat. No. 11,365,026 Filed Sep. 17, 2024, 9 pages.
Exhibit 1006 in Petition for Inter Partes Review of U.S. Pat. No. 11,365,026 Filed Sep. 17, 2024, 21 pages.
Exhibit 1007 in Petition for Inter Partes Review of U.S. Pat. No. 11,365,026 Filed Sep. 17, 2024, 16 pages.
Exhibit 1008 in Petition for Inter Partes Review of U.S. Pat. No. 11,365,026 Filed Sep. 17, 2024, 31 pages.
Exhibit 1009 in Petition for Inter Partes Review of U.S. Pat. No. 11,365,026 Filed Sep. 17, 2024, 6 pages.
Exhibit 1010 in Petition for Inter Partes Review of U.S. Pat. No. 11,365,026 Filed Sep. 17, 2024, 4 pages.
Exhibit 1011 in Petition for Inter Partes Review of U.S. Pat. No. 11,365,026 Filed Sep. 17, 2024, 16 pages.
Exhibit 1012 in Petition for Inter Partes Review of U.S. Pat. No. 11,365,026 Filed Sep. 17, 2024, 8 pages.
Exhibit 1013 in Petition for Inter Partes Review of U.S. Pat. No. 11,365,026 Filed Sep. 17, 2024, 19 pages.
Exhibit 1014 in Petition for Inter Partes Review of U.S. Pat. No. 11,365,026 Filed Sep. 17, 2024, 35 pages.
Exhibit 1015 in Petition for Inter Partes Review of U.S. Pat. No. 11,365,026 Filed Sep. 17, 2024, 11 pages.
Exhibit 1016 in Petition for Inter Partes Review of U.S. Pat. No. 11,365,026 Filed Sep. 17, 2024, 193 pages.
Exhibit 1017 in Petition for Inter Partes Review of U.S. Pat. No. 11,365,026 Filed Sep. 17, 2024, 29 pages.
Exhibit 1018 in Petition for Inter Partes Review of U.S. Pat. No. 11,365,026 Filed Sep. 17, 2024, 15 pages.
Exhibit 1019 in Petition for Inter Partes Review of U.S. Pat. No. 11,365,026 Filed Sep. 17, 2024, 19 pages.
Exhibit 1020 in Petition for Inter Partes Review of U.S. Pat. No. 11,365,026 Filed Sep. 17, 2024, 18 pages.
Exhibit 1021 in Petition for Inter Partes Review of U.S. Pat. No. 11,365,026 Filed Sep. 17, 2024, 313 pages.

(56) References Cited

OTHER PUBLICATIONS

Exhibit 1030 in Petition for Inter Partes Review of U.S. Pat. No. 11,365,026 Filed Sep. 17, 2024, 95 pages.
Exhibit 1031 in Petition for Inter Partes Review of U.S. Pat. No. 11,365,026 Filed Sep. 17, 2024, 5 pages.
Exhibit 1032 in Petition for Inter Partes Review of U.S. Pat. No. 11,365,026 Filed Sep. 17, 2024, 19 pages.
Inter Partes Review No. 2024-01401, "Petition for Inter Partes Review of U.S. Pat. No. 11,794,952" Filed Sep. 17, 2024, 165 pages.
Exhibit 1001 in Petition for Inter Partes Review of U.S. Pat. No. 11,794,952 Filed Sep. 17, 2024, 67 pages.
Exhibit 1002 Part 1 in Petition for Inter Partes Review of U.S. Pat. No. 11,794,952 Filed Sep. 17, 2024, 227 pages.
Exhibit 1002 Part 2 in Petition for Inter Partes Review of U.S. Pat. No. 11,794,952 Filed Sep. 17, 2024, 278 pages.
Exhibit 1003 in Petition for Inter Partes Review of U.S. Pat. No. 11,794,952 Filed Sep. 17, 2024, 168 pages.
Exhibit 1004 in Petition for Inter Partes Review of U.S. Pat. No. 11,794,952 Filed Sep. 17, 2024, 17 pages.
Exhibit 1005 in Petition for Inter Partes Review of U.S. Pat. No. 11,794,952 Filed Sep. 17, 2024, 9 pages.
Exhibit 1006 in Petition for Inter Partes Review of U.S. Pat. No. 11,794,952 Filed Sep. 17, 2024, 21 pages.
Exhibit 1007 in Petition for Inter Partes Review of U.S. Pat. No. 11,794,952 Filed Sep. 17, 2024, 16 pages.
Exhibit 1008 in Petition for Inter Partes Review of U.S. Pat. No. 11,794,952 Filed Sep. 17, 2024, 31 pages.
Exhibit 1009 in Petition for Inter Partes Review of U.S. Pat. No. 11,794,952 Filed Sep. 17, 2024, 6 pages.
Exhibit 1010 in Petition for Inter Partes Review of U.S. Pat. No. 11,794,952 Filed Sep. 17, 2024, 4 pages.
Exhibit 1011 in Petition for Inter Partes Review of U.S. Pat. No. 11,794,952 Filed Sep. 17, 2024, 16 pages.
Exhibit 1012 in Petition for Inter Partes Review of U.S. Pat. No. 11,794,952 Filed Sep. 17, 2024, 8 pages.
Exhibit 1013 in Petition for Inter Partes Review of U.S. Pat. No. 11,794,952 Filed Sep. 17, 2024, 19 pages.
Exhibit 1014 in Petition for Inter Partes Review of U.S. Pat. No. 11,794,952 Filed Sep. 17, 2024, 35 pages.
Exhibit 1015 in Petition for Inter Partes Review of U.S. Pat. No. 11,794,952 Filed Sep. 17, 2024, 11 pages.
Exhibit 1016 in Petition for Inter Partes Review of U.S. Pat. No. 11,794,952 Filed Sep. 17, 2024, 193 pages.
Exhibit 1017 in Petition for Inter Partes Review of U.S. Pat. No. 11,794,952 Filed Sep. 17, 2024, 29 pages.
Exhibit 1018 in Petition for Inter Partes Review of U.S. Pat. No. 11,794,952 Filed Sep. 17, 2024, 15 pages.
Exhibit 1019 in Petition for Inter Partes Review of U.S. Pat. No. 11,794,952 Filed Sep. 17, 2024, 19 pages.
Exhibit 1020 in Petition for Inter Partes Review of U.S. Pat. No. 11,794,952 Filed Sep. 17, 2024, 18 pages.
Exhibit 1021 in Petition for Inter Partes Review of U.S. Pat. No. 11,794,952 Filed Sep. 17, 2024, 313 pages.
Exhibit 1022 in Petition for Inter Partes Review of U.S. Pat. No. 11,794,952 Filed Sep. 17, 2024, 324 pages.
Exhibit 1023 in Petition for Inter Partes Review of U.S. Pat. No. 11,794,952 Filed Sep. 17, 2024, 5 pages.
Exhibit 1024 in Petition for Inter Partes Review of U.S. Pat. No. 11,794,952 Filed Sep. 17, 2024, 7 pages.
Exhibit 1025 in Petition for Inter Partes Review of U.S. Pat. No. 11,794,952 Filed Sep. 17, 2024, 15 pages.
Exhibit 1026 in Petition for Inter Partes Review of U.S. Pat. No. 11,794,952 Filed Sep. 17, 2024, 37 pages.
Exhibit 1027 in Petition for Inter Partes Review of U.S. Pat. No. 11,794,952 Filed Sep. 17, 2024, 7 pages.
Exhibit 1028 in Petition for Inter Partes Review of U.S. Pat. No. 11,794,952 Filed Sep. 17, 2024, 33 pages.
Exhibit 1030 in Petition for Inter Partes Review of U.S. Pat. No. 11,794,952 Filed Sep. 17, 2024, 95 pages.
Exhibit 1031 in Petition for Inter Partes Review of U.S. Pat. No. 11,794,952 Filed Sep. 17, 2024, 5 pages.
Exhibit 1032 in Petition for Inter Partes Review of U.S. Pat. No. 11,794,952 Filed Sep. 17, 2024, 60 pages.

* cited by examiner

VACUUM FOR USE WITH MODULAR STORAGE SYSTEM

CROSS-REFERENCE TO RELATED PATENT APPLICATION

The present application is a continuation of International Application No. PCT/US2020/057043, filed Oct. 23, 2020, which claims the benefit of and priority to U.S. Provisional Application No. 62/926,173, filed on Oct. 25, 2019, both of which are incorporated herein by reference in their entireties.

BACKGROUND OF THE INVENTION

The present disclosure is directed generally to the field of tool storage systems and related devices. The present disclosure relates specifically to a vacuum and a coupling mechanism to detachably couple the vacuum to another device or container, such as in a modular tool storage system.

Tool storage units are often used to transport tools and tool accessories. Some storage units are designed to incorporate into a modular storage system. Within a modular storage system, different units, devices and/or containers may provide varying functions, such as being adapted to vacuum debris and waste.

SUMMARY OF THE INVENTION

According to an embodiment, this disclosure relates to a modular storage system, such as a container assembly, that includes a vacuum and a first utility module, with the vacuum being coupled to a top of the first utility module. The vacuum includes a motor and a housing. The housing includes a front wall, a rear wall opposite the front wall, the rear wall separated from the front wall by a first depth in a first direction, two sidewalls extending between the front wall and the rear wall, an internal compartment located within the housing, an inlet through which debris enters the internal compartment when the motor is operating, an outlet through which air exits the internal compartment when the motor is operating, and a first plurality of coupling mechanisms located along a bottom surface of the housing. The first utility module includes a second plurality of coupling mechanisms, one or more of the second plurality of coupling mechanisms configured to detachably engage with the first plurality of coupling mechanisms. The first utility module extends a second depth in the first direction that is at least twice the first depth. This combination of dimensions permits additional devices, such as a modular tool storage device, to also be coupled to the top of the first utility module.

According to an embodiment, this disclosure relates to a vacuum configured to be coupled to a tool storage device, the vacuum including a base, a top panel opposite the base, a housing and a hose. The housing includes a first lateral wall that extends from the base to the top panel. The first lateral wall includes an operating switch and a coupling lock, and defines an inlet for the vacuum. The coupling lock is configured to facilitate coupling the vacuum with another housing, such as of a storage container, that the vacuum is placed on. The hose is coupled to the inlet and is configured to couple to a rib that protrudes from the first lateral wall.

According to an embodiment, this disclosure relates a vacuum including a motor, a hose, a housing and an operating switch. The housing includes a bottom panel, a top panel, the top panel including a plurality of coupling mechanisms configured to couple the vacuum to a utility module, an internal compartment located within the housing, a first lateral wall extending upwards from the bottom panel, an inlet extending through the first lateral wall through which debris enters the internal compartment when the motor is operating, and a recess configured to receive the hose. The operating switch is coupled to the first lateral wall. The operating switch configured to toggle whether the motor is operating.

According to an embodiment, this disclosure relates to a vacuum that includes a base, a top panel opposite the base, a housing, and a hose. The housing defines an inlet for the vacuum. The housing has a first lateral wall that extends from the base to the top panel. The first lateral wall defines a recess that comprises a rib that couples to the rib. In a specific embodiment three lateral walls of the housing have a recess that each comprise a rib that couples to the hose.

According to an embodiment, this disclosure relates to a vacuum including a base, a top panel opposite the base, a housing and a handle. The housing defines an inlet for the vacuum and has two opposing lateral walls that extend from the base to the top panel. The handle is pivotally coupled to the housing and actuates between a first position and a second position. When the handle is in the first position the end of the handle extends past the first lateral wall, and when the handle is in the second position the end of the handle extends past the second lateral wall. In a specific embodiment the base and the top panel each define interface(s) to couple the vacuum to a container.

According to an embodiment, this disclosure relates to a vacuum including a motor, a housing and a handle. The housing includes a bottom panel, a plurality of coupling mechanisms extending from the bottom panel configured to couple the vacuum to a utility module, a front wall extending upwards from the bottom panel, a rear wall opposite the front wall and extending upwards from the bottom panel, an internal compartment located within the housing, an inlet through which debris enters the internal compartment when the motor is operating, and an outlet through which air exits the internal compartment when the motor is operating. The handle is pivotally coupled to the housing. The handle actuates between a first position and a second position. When the handle is in the first position an end of the handle extends past the front wall, and when the handle is in the second position the end of the handle extends past the rear wall.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION

Figure 1:
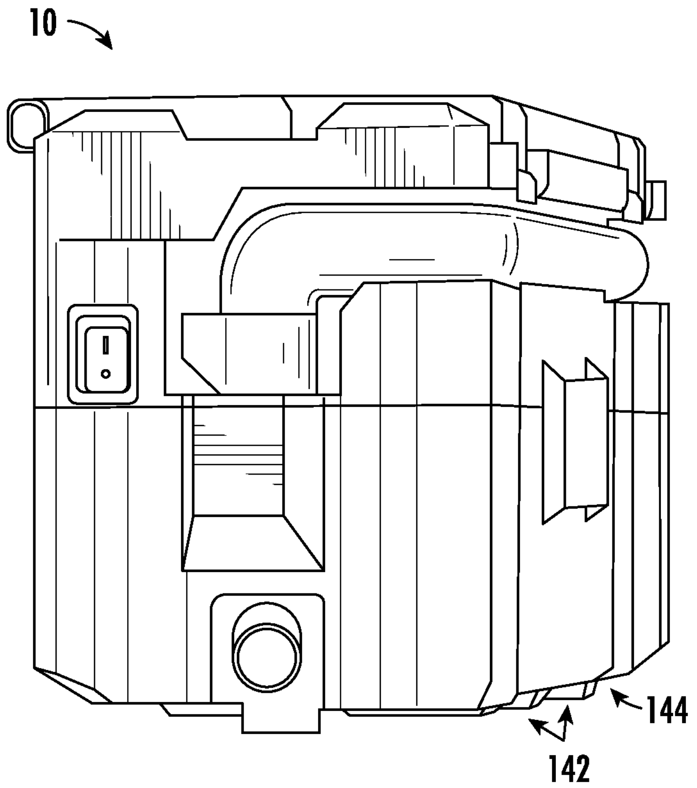
FIG. 1 is a perspective view of a vacuum, according to an exemplary embodiment.
Figure 2:
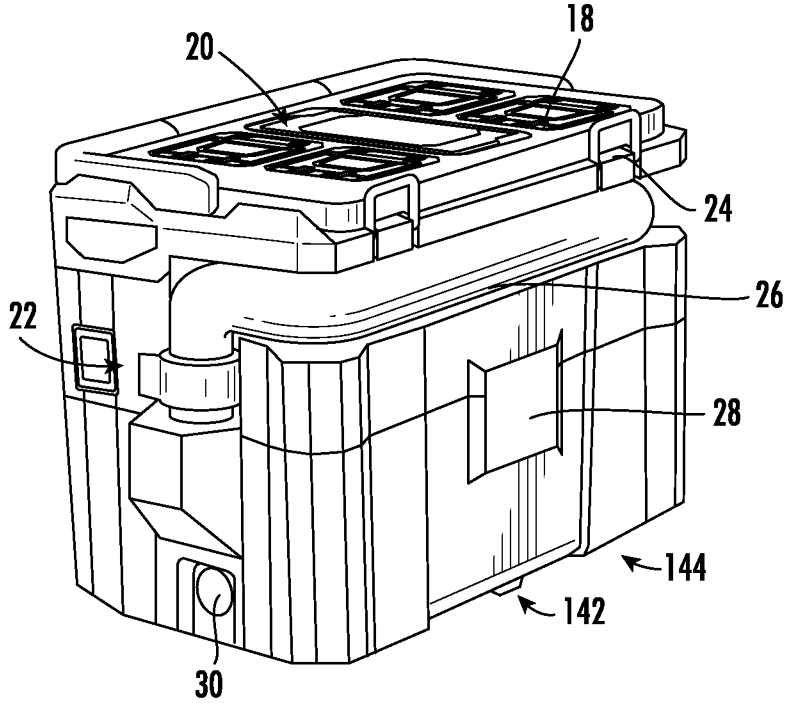
FIG. 2 is a perspective view of the vacuum of FIG. 1, according to an exemplary embodiment.
Figure 3:
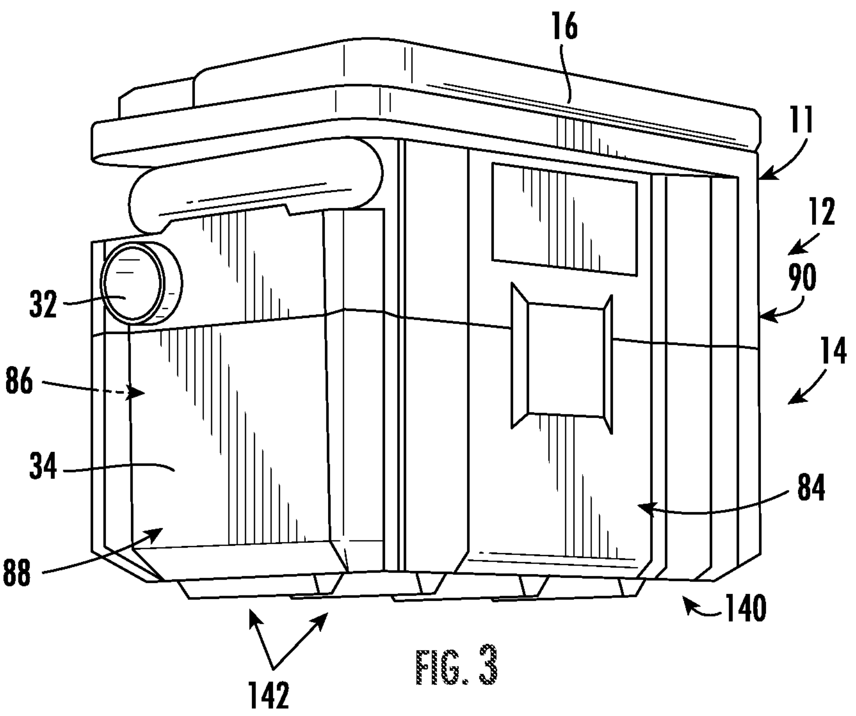
FIG. 3 is a perspective view of the vacuum of FIG. 1, according to an exemplary embodiment.
Figure 4:
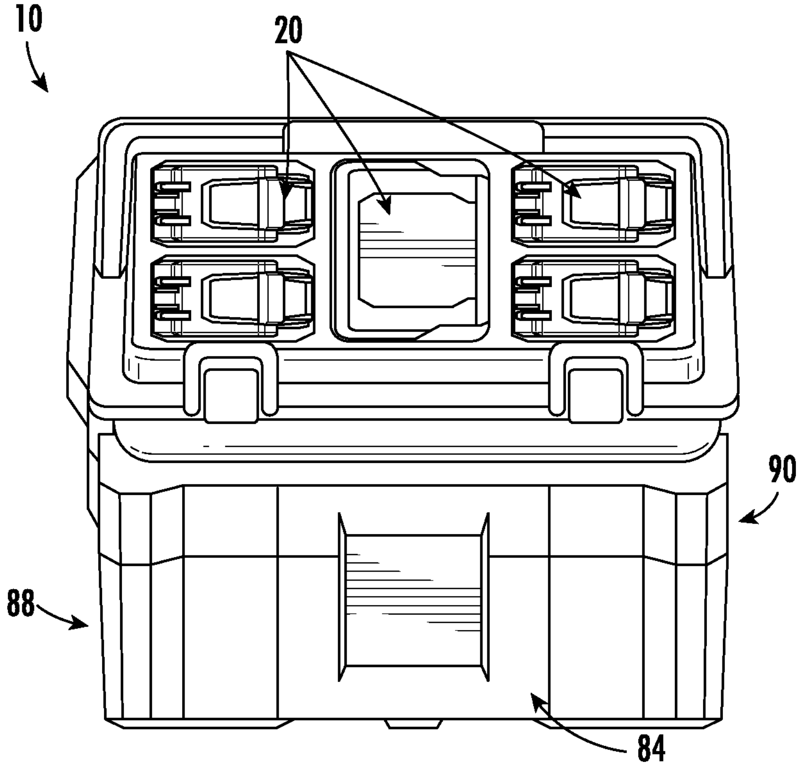
FIG. 4 is a perspective view of the vacuum of FIG. 1, according to an exemplary embodiment.
Figure 5:
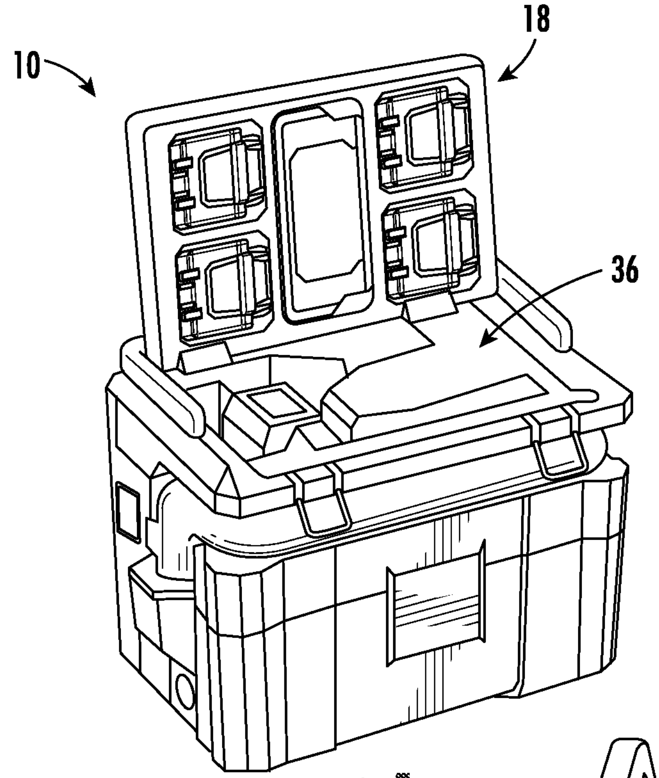
FIG. 5 is a perspective view of the vacuum of FIG. 1, according to an exemplary embodiment.
Figure 6:
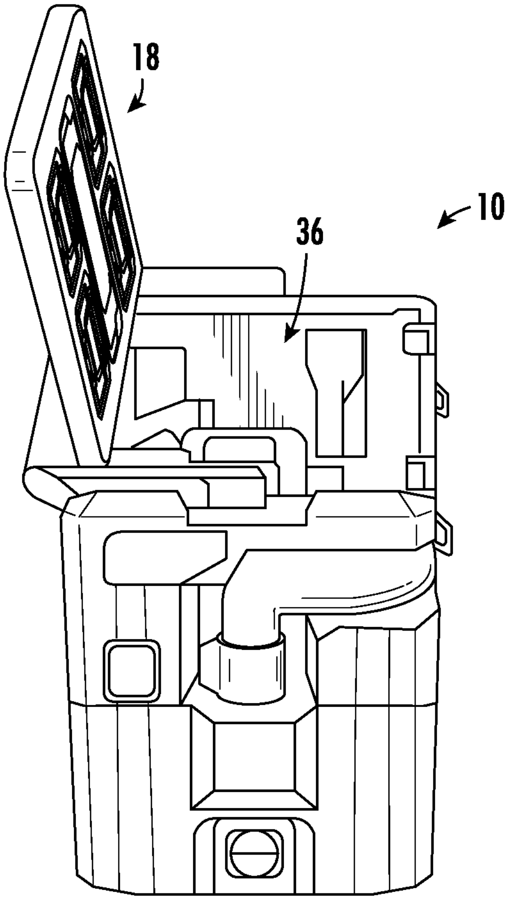
FIG. 6 is a perspective view of the vacuum of FIG. 1, according to an exemplary embodiment.
Figure 7:
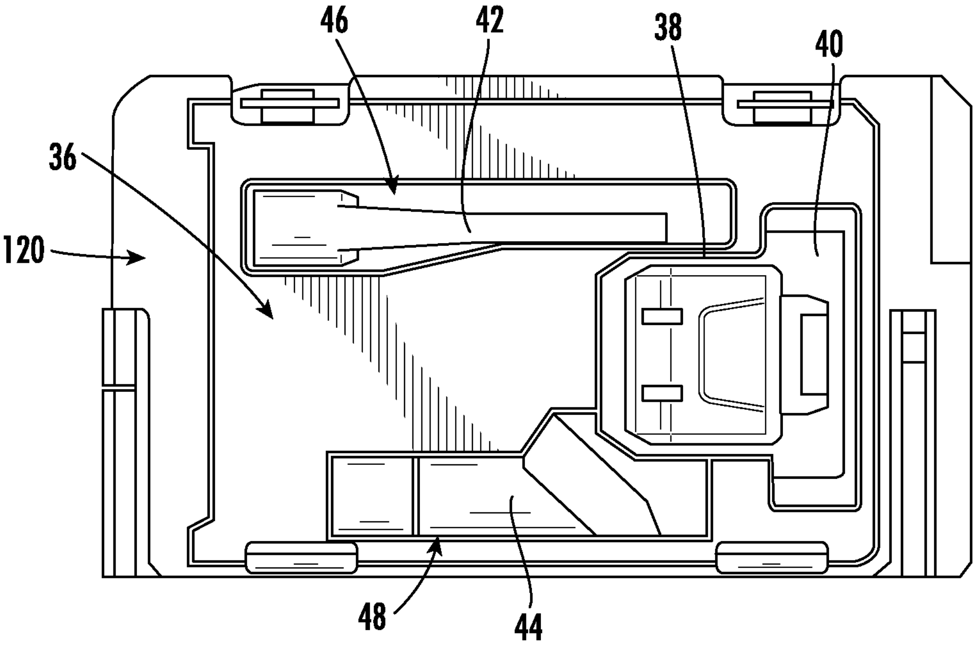
FIG. 7 is a detailed top view of the vacuum of FIG. 1, according to an exemplary embodiment.
Figure 8:
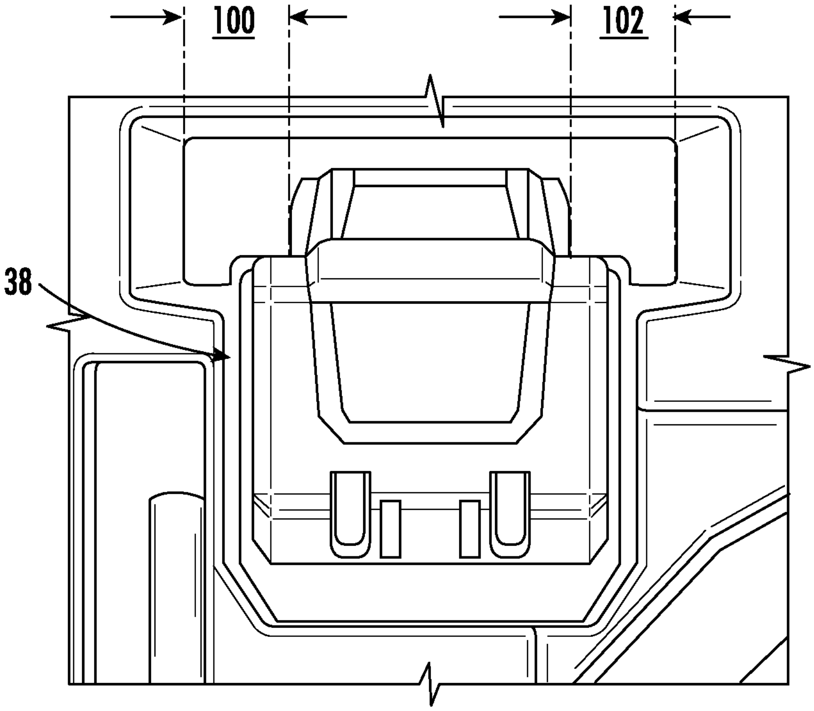
FIG. 8 is a detailed top view of the vacuum of FIG. 1, according to an exemplary embodiment.
Figure 9:
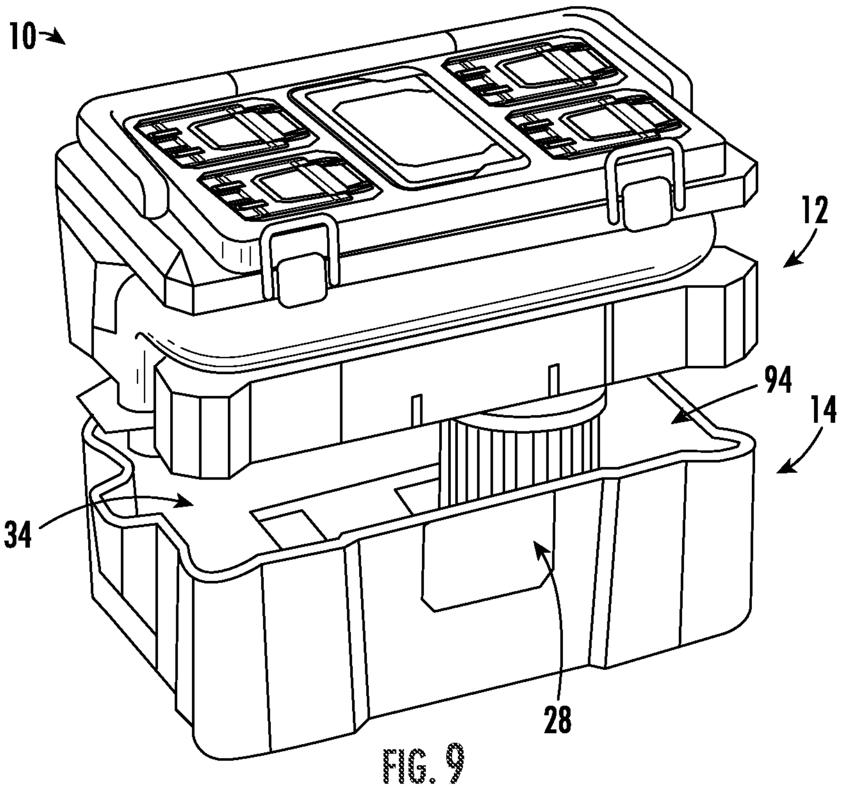
FIG. 9 is an exploded perspective view of the vacuum of FIG. 1, according to an exemplary embodiment.
Figure 10:
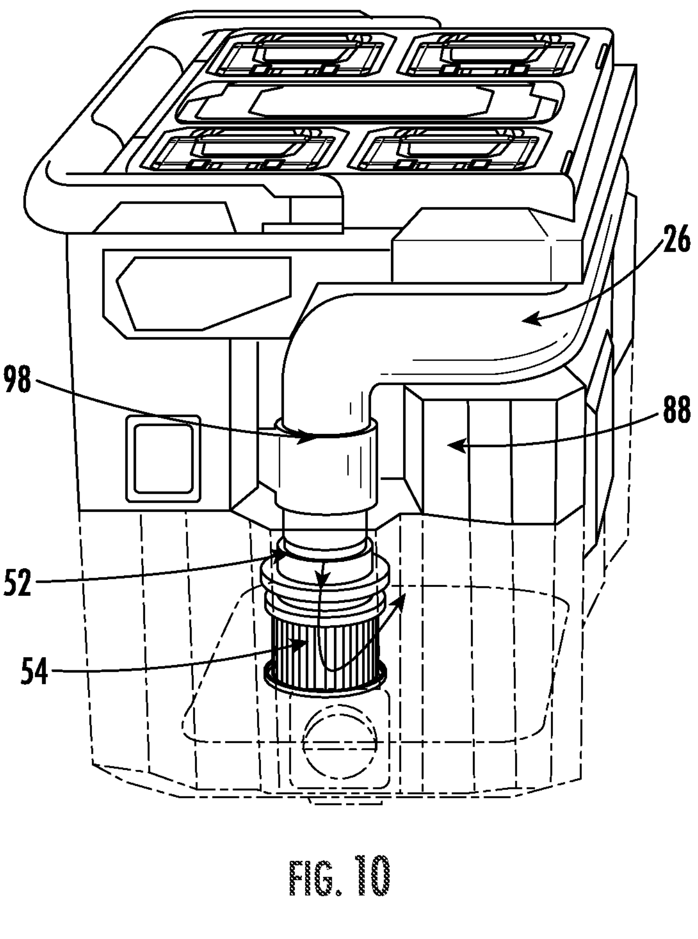
FIG. 10 is a phantom perspective view of the vacuum of FIG. 1, according to an exemplary embodiment.
Figure 11:
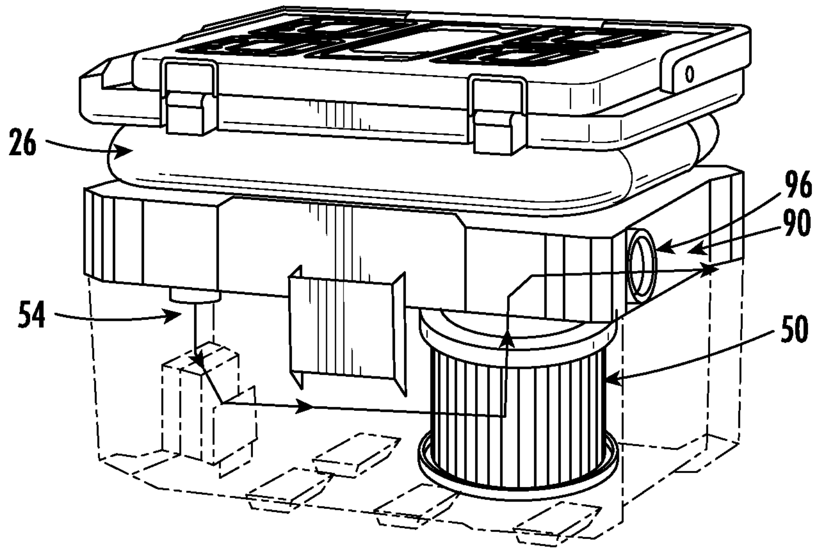
FIG. 11 is a phantom perspective view of the vacuum of FIG. 1, according to an exemplary embodiment.
Figure 12:
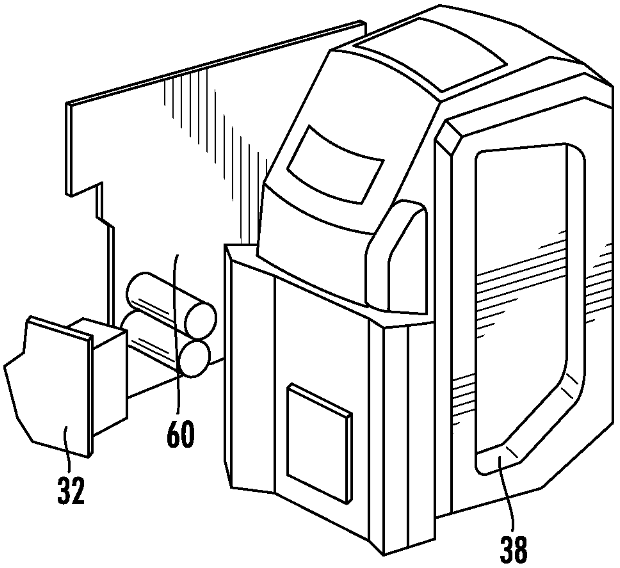
FIG. 12 is a perspective view of several components of the vacuum of FIG. 1, according to an exemplary embodiment.
Figure 13:
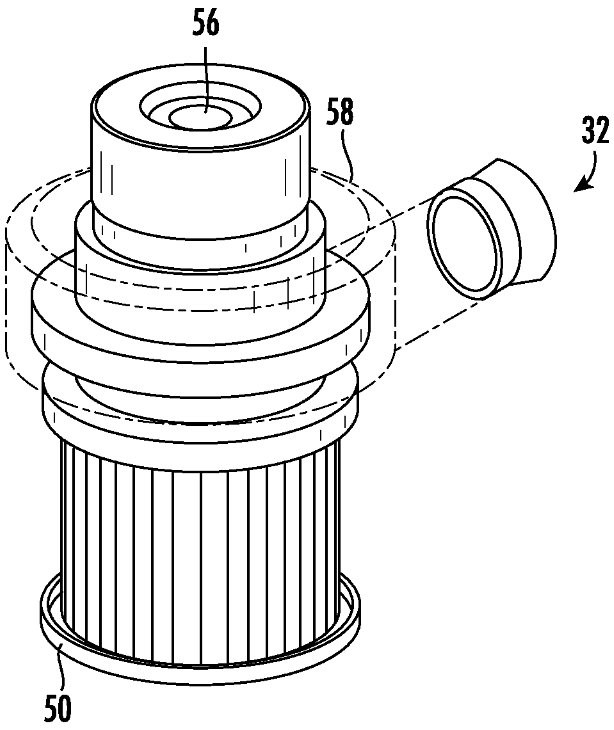
FIG. 13 is a phantom perspective view of several components of the vacuum of FIG. 1, according to an exemplary embodiment.
Figure 14:
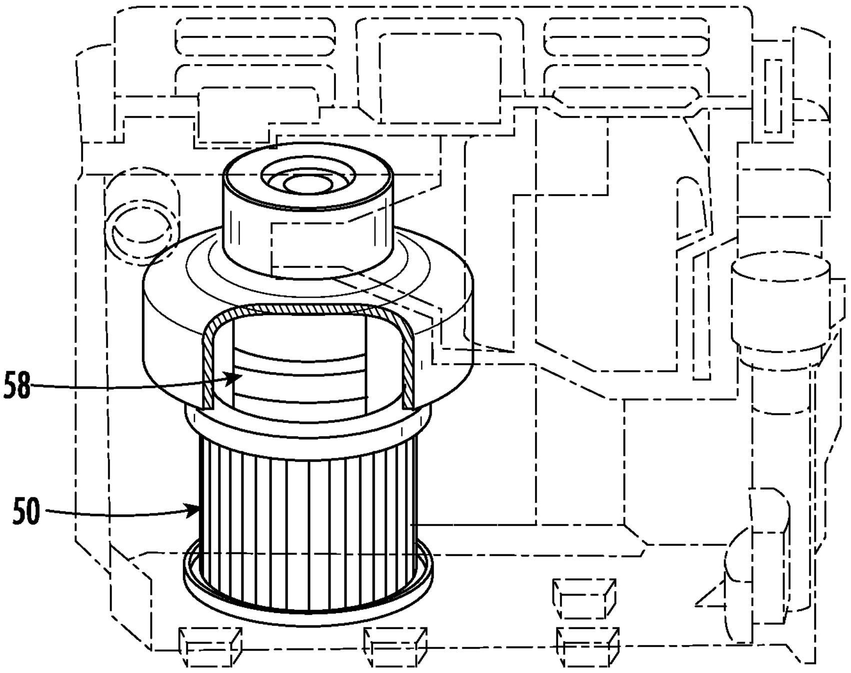
FIG. 14 is a phantom perspective view of a cross-section of the vacuum of FIG. 1, according to an exemplary embodiment.
Figure 15:
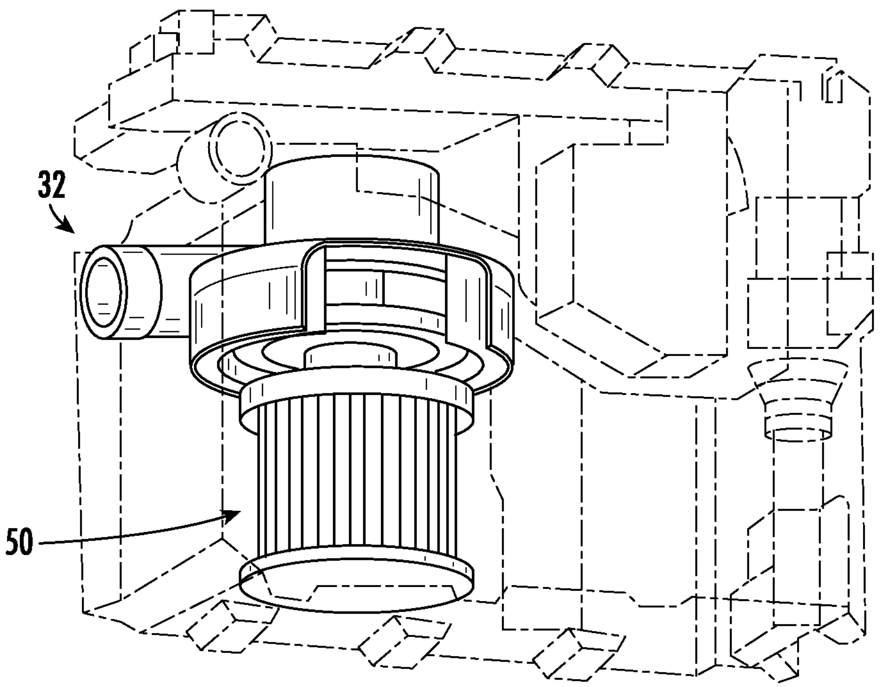
FIG. 15 is a phantom perspective view of a cross-section of the vacuum of FIG. 1, according to an exemplary embodiment.

Referring generally to the figures, various embodiments of a stackable tool storage related device, container or unit are shown. One or more of the devices are configured to selectively couple and decouple with storage units. In a specific embodiment, a vacuum that can be used to collect and store waste is provided with modular coupling structures that allow for the vacuum to be coupled to/stacked with stackable tool storage related devices. As compared to a vacuum unit that does not incorporate into a modular storage system, one advantage of this design is the vacuum unit can be easily transported with other modular storage units. As discussed in more detail below, the modular vacuum discussed herein includes one or more feature, such as location of exterior vacuum controls/mechanisms, hose storage features, handle storage features, etc., that Applicant has determined provide for a variety of advantages for a vacuum used with a modular tool storage system. In one embodiment, the modular vacuum is configured with an operating switch and an inlet located on the same wall of the vacuum, thereby allowing the vacuum to be incorporated into a modular system while still providing access to the hose and operating switch for their use. In another embodiment, a handle pivotally coupled to the vacuum can be positioned to either side of the vacuum, thereby providing flexibility to how the vacuum can be incorporated into and positioned within a modular system.

Referring to FIGS. 1-4, a device, such as a utility module for suctioning up debris and liquids, depicted as vacuum 10, is shown according to an exemplary embodiment. An operating switch, shown as switch 22, controls the operation of vacuum 10, such as being configured to toggle whether the vacuum 10 is operating (e.g, turned on or off). Top panel 18 is secured to upper housing 12 via top lid latch 24, and upper housing 12 and lower housing 14 are secured together via a canister latch 28. When vacuum 10 is not in use and/or being transported, hose 26 is secured to upper housing 12. In a specific embodiment, housing 11 includes upper housing 12 and lower housing 14.

First plurality of coupling mechanisms 142 are located along a bottom surface 144 of lower housing 14. Top panel 18 includes a plurality of coupling mechanisms 20. Plurality of coupling mechanisms 20 and first plurality of coupling mechanisms 142 permit vacuum 10 to couple to a utility module, such as a modular storage unit, via an interface compatible with the coupling mechanism(s) described in International Patent Application No. PCT/US2018/044629, which is incorporated by reference in its entirety. In another specific embodiment, a storage device that includes features described in this disclosure has coupling interfaces on both the top and bottom that permit the storage device to couple to a modular storage unit via an interface compatible with the coupling mechanism(s) described in International Patent Application No. PCT/US2018/044629. Lock 30 secures vacuum 10 to another modular storage unit that vacuum 10 is placed on.

Handle 16 is pivotally coupled to upper housing 12 of housing 11, and permits the carrying of vacuum 10. Vacuum 10 ejects air through blower port 32, and the debris gathered by vacuum 10 is stored in canister 34. In the specific embodiment shown, canister 34 has a volume capacity of two gallons, although other volumes could be utilized and still practice this disclosure.

In a specific embodiment switch 22, lock 30, and hose 26 are coupled to the same wall of vacuum 10, e.g., first lateral wall 88. This positioning permits easier and more intuitive interactions, while permitting positioning of vacuum 10 on other modular storage units so that each of switch 22, lock 30, and hose 26 are fully accessible.

In a specific embodiment, bottom panel 140 includes plurality of coupling mechanisms 142 extending from bottom surface 144 of bottom panel 140. Housing 11 includes front wall 84, rear wall 86 opposite front wall 84, two sidewalls, shown as first lateral wall 88 and second lateral wall 90 opposite first lateral wall 88, each of the two sidewalls extending between the front wall 84 and the rear wall 86. Front wall 84 extends upwards from bottom panel 140, rear wall 86 extends upwards from bottom panel 140 opposite front wall 84, first lateral wall 88 extends upwards from bottom panel 140 and extends from the front wall 84 to the rear wall 86, and second lateral wall 90 extends upwards from bottom panel 140 opposite first lateral wall 88 and extends between front wall 84 and rear wall 86.

Turning to FIGS. 5-8, various aspects of accessories for use with vacuum 10 are shown. Top panel 18 is pivotally coupled to upper housing 12. When top panel 18 is pivoted opened, panel 36 within vacuum 10 is exposed. Panel 36 is inside vacuum 10 and defines several compartments 40, 46 and 48 to house battery 38, vacuum crevice tool 42, and vacuum utility tool 44, respectively. When top panel 18 is closed and affixed above upper housing 12, top panel 18 protects battery 38, vacuum crevice tool 42, and vacuum utility tool 44. In a specific embodiment compartment 40 is sized to conform to keep-out zone requirements, such as by having widths 100 and 102 of 26 mm between battery 38 and sidewalls of compartment 40.

Turning to FIGS. 9-15, various aspects of components and the functionality of vacuum 10 are depicted. Vacuum 10 includes motor 56 disposed within the housing 11. Upper housing 12 is detachable from lower housing 14, such as when latch 28 is decoupled, to expose internal compartment 94, which is located within housing 11. Lower housing 14 defines canister 34, which in a specific embodiment has a volume of 2 gallons. Debris enters internal compartment 94 through inlet 98 when the motor is operating, and debris exits internal compartment 94 through outlet 96 when the motor is operating. Hose 26 is coupled to inlet 98, thereby providing a fluid connection between hose 26 and internal compartment 94. When vacuum 10 is in use, air and debris enters canister 34 via hose 26 and transits inlet 98. The air and debris then transit opening 52 and generally follows air flow 54 through a filter 50 into air flow tunnel 58 and exits blower port 32 and subsequently outlet 96. In a specific embodiment, inlet 98 is defined within first lateral wall 88 and extends through first lateral wall 88, and outlet 96 is defined within second lateral wall 90 and extends through second lateral wall 90. In a specific embodiment, a switch, shown as rubber switch 22, controls primary control board 60 to control operation of vacuum 10, providing power from battery 38 to motor 56. In a specific embodiment motor 56 is a brushless DC motor, battery 38 is a 12 AH Lithium battery that couples to and provides power to electric power tools, and filter 50 is a HEPA filter.

Figure 16:
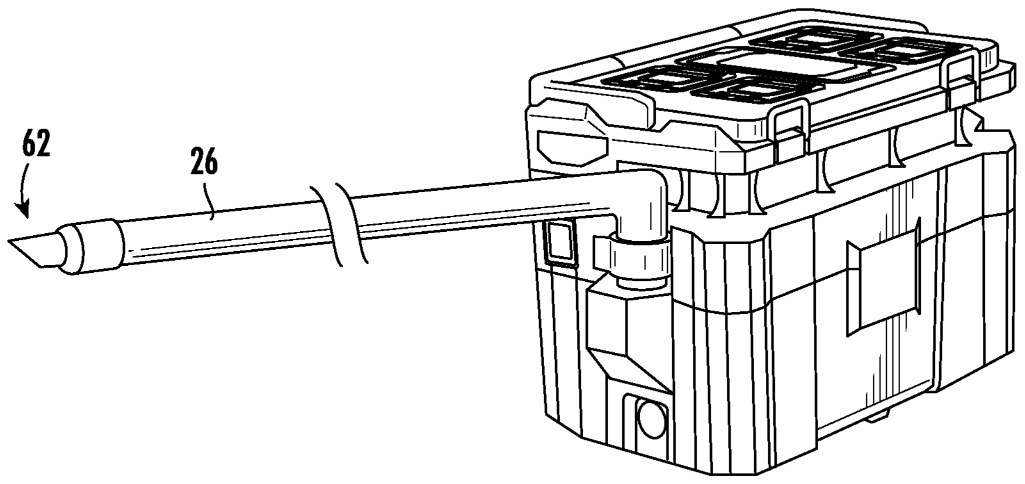
FIG. 16 is a perspective view of the vacuum of FIG. 1, according to an exemplary embodiment.
Figure 17:
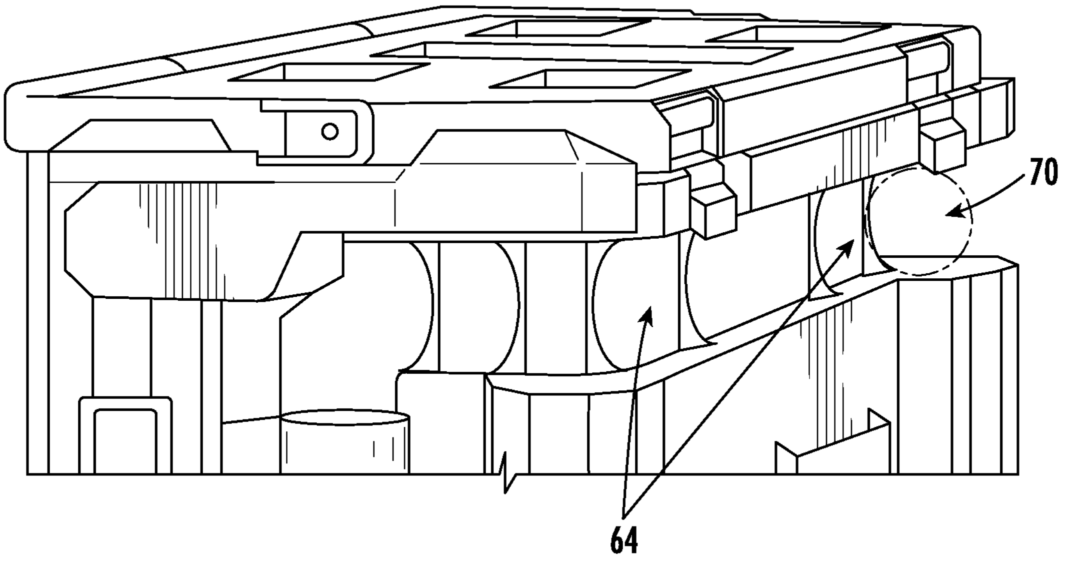
FIG. 17 is a detailed perspective view of the vacuum of FIG. 1, according to an exemplary embodiment.
Figure 18:
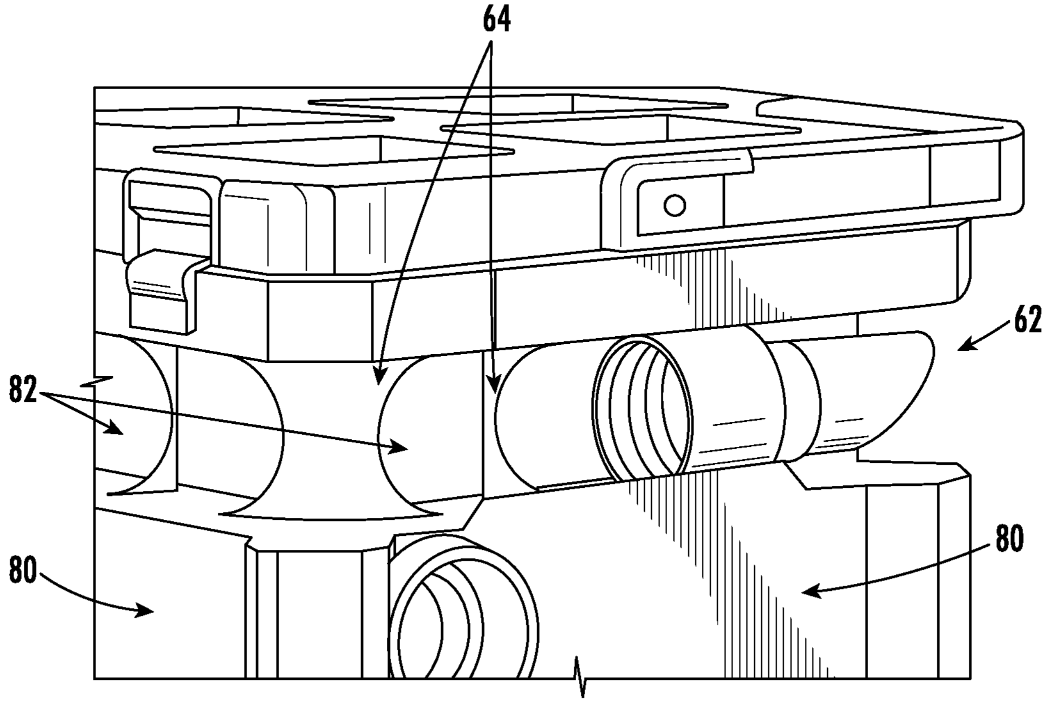
FIG. 18 is a detailed perspective view of the vacuum of FIG. 1, according to an exemplary embodiment.
Figure 19:
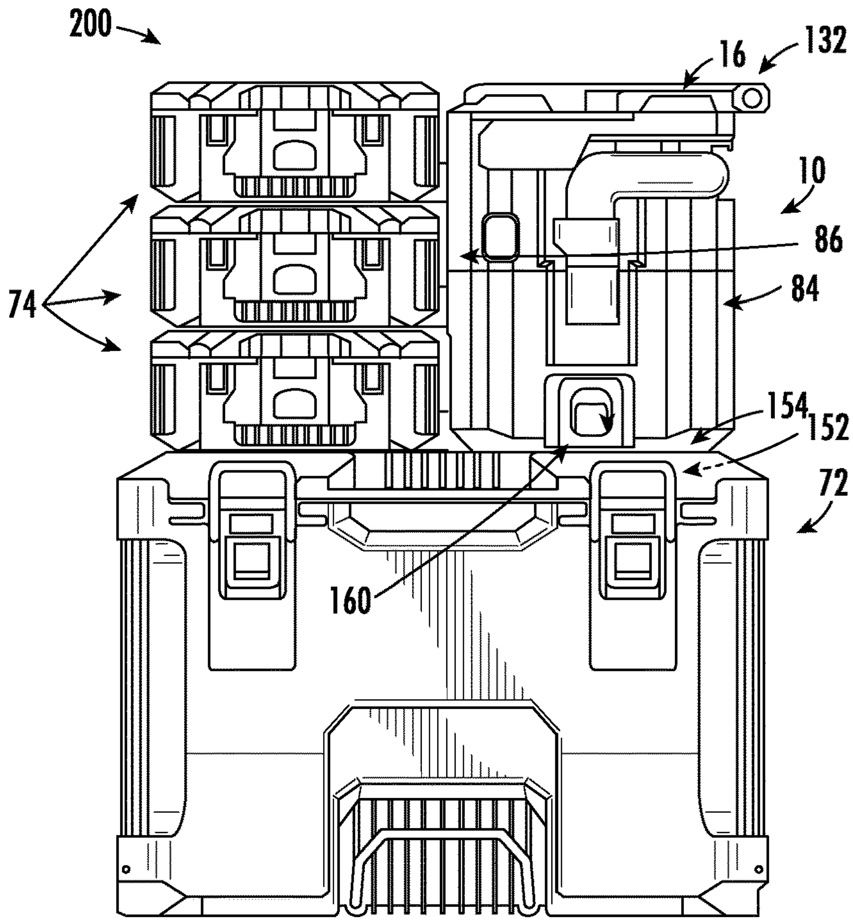
FIG. 19 is a side view of a modular tool storage system that includes the vacuum of FIG. 1, according to an exemplary embodiment.
Figure 20:
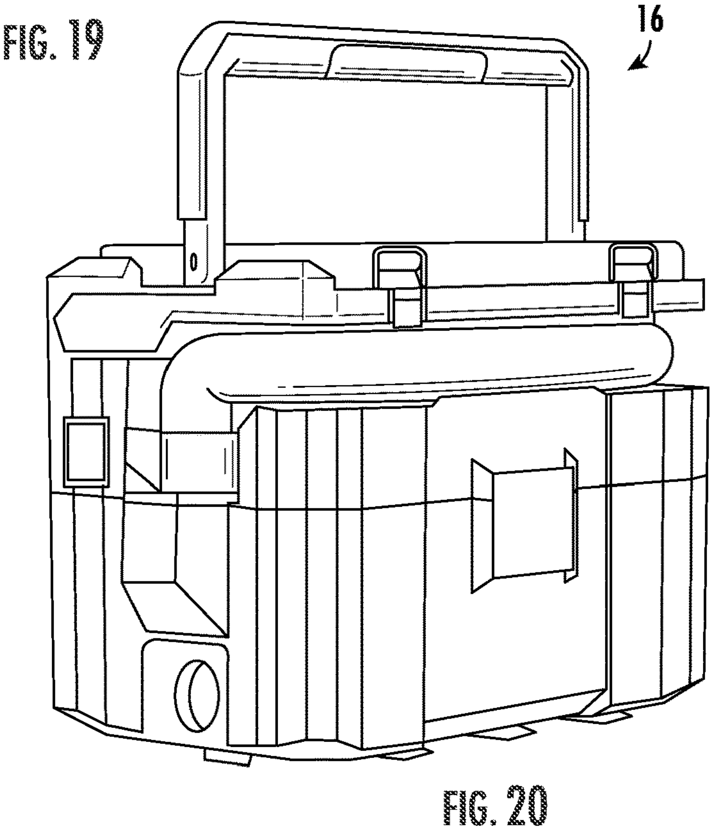
FIG. 20 is a perspective view of the vacuum of FIG. 1, according to an exemplary embodiment.

Turning to FIGS. 16-18, various aspects of hose 26 are shown. In a specific embodiment, end 62 of hose 26 extends six feet from vacuum 10. When not in use, hose 26 is secured to ribs 64 that are coupled to upper housing 12. The plurality of ribs 64 protrude into recess 82, and the plurality of ribs 64 are configured to receive hose 26. The diameter 70 of ribs 64 is sized to provide a friction fit for hose 26 when hose 26 is secured within ribs 64, such as, for example, if diameter 70 of ribs 64 is slightly less than a diameter of hose 26. In a specific embodiment, hose 26 is positionable entirely within recess 82 within housing 11, such as within first lateral wall 88, so that hose 26 does not extend outside of recess 82 and past first lateral wall 88.

Figure 21:
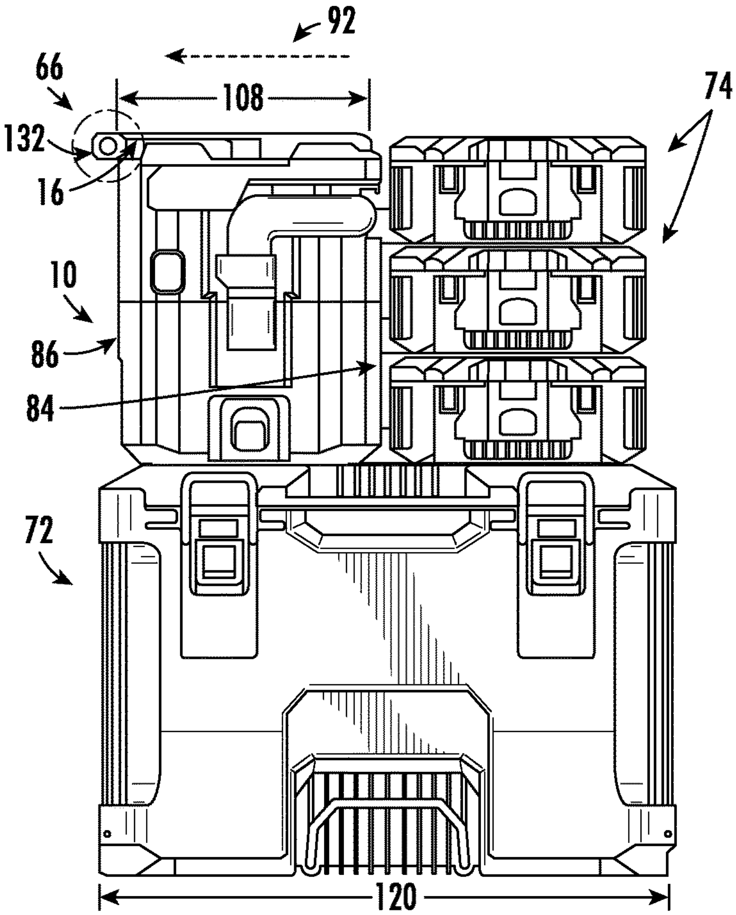
FIG. 21 is a side view of a modular tool storage system that includes the vacuum of FIG. 1, according to an exemplary embodiment.
Figure 22:
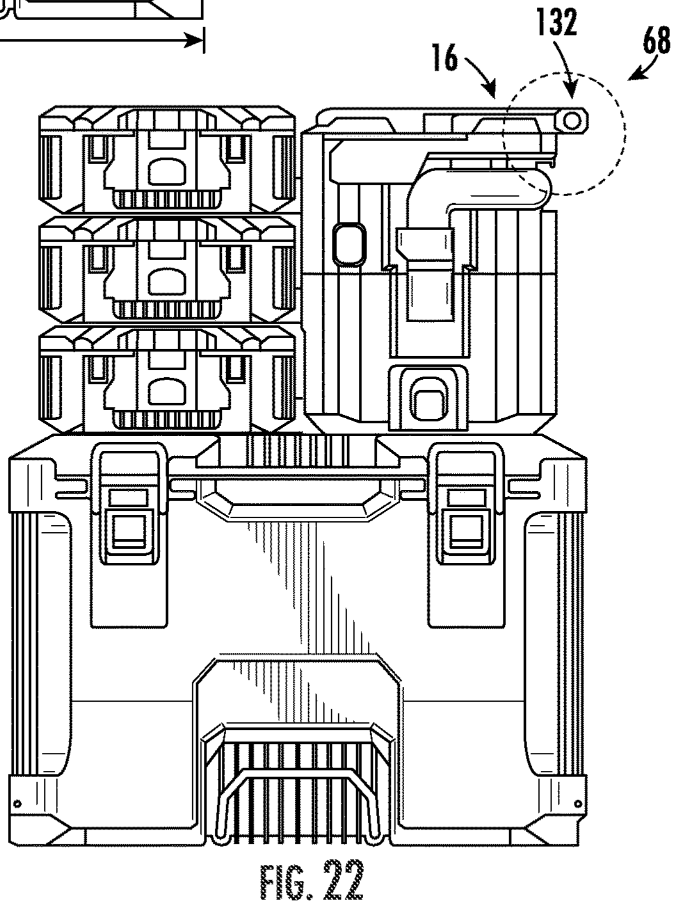
FIG. 22 is a side view of a modular tool storage system that includes the vacuum of FIG. 1, according to an exemplary embodiment.
Figure 23:
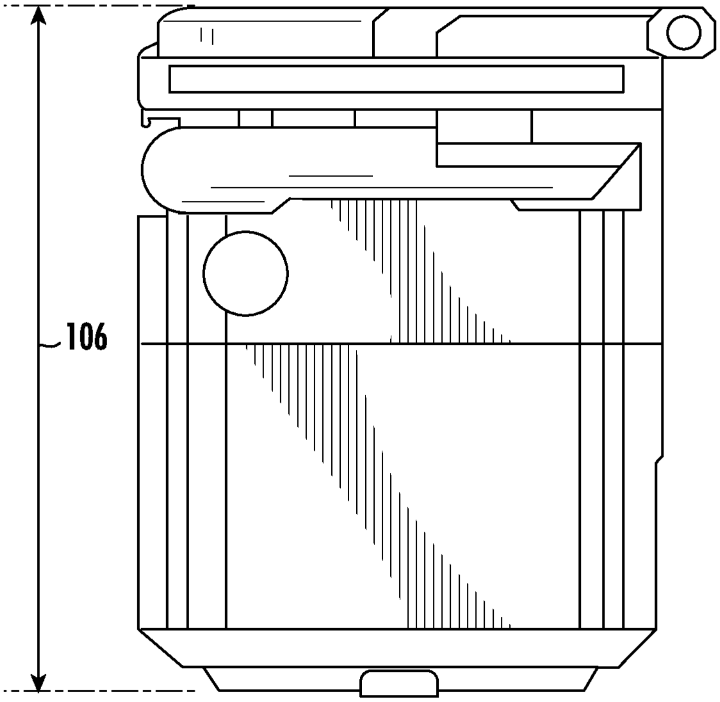
FIG. 23 is a side view of the vacuum of FIG. 1, according to an exemplary embodiment.
Figure 24:
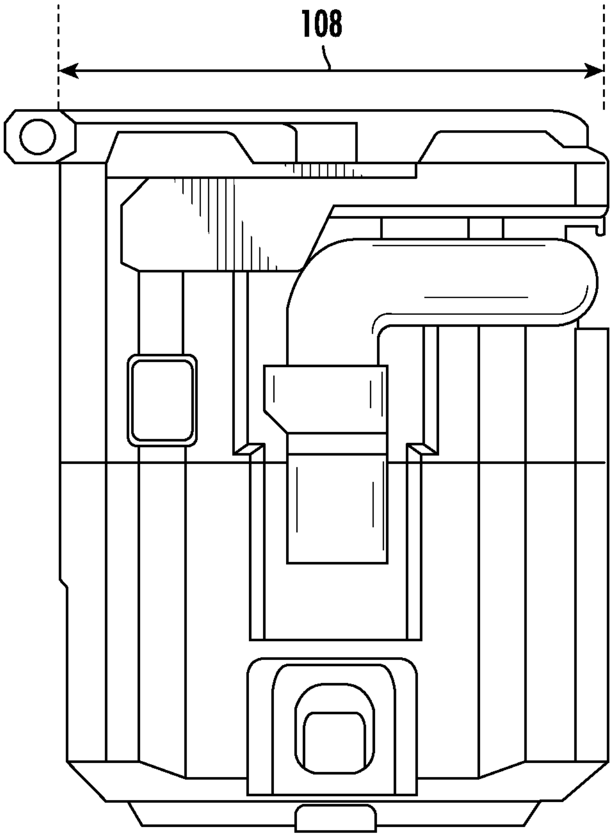
FIG. 24 is a side view of the vacuum of FIG. 1, according to an exemplary embodiment.
Figure 25:
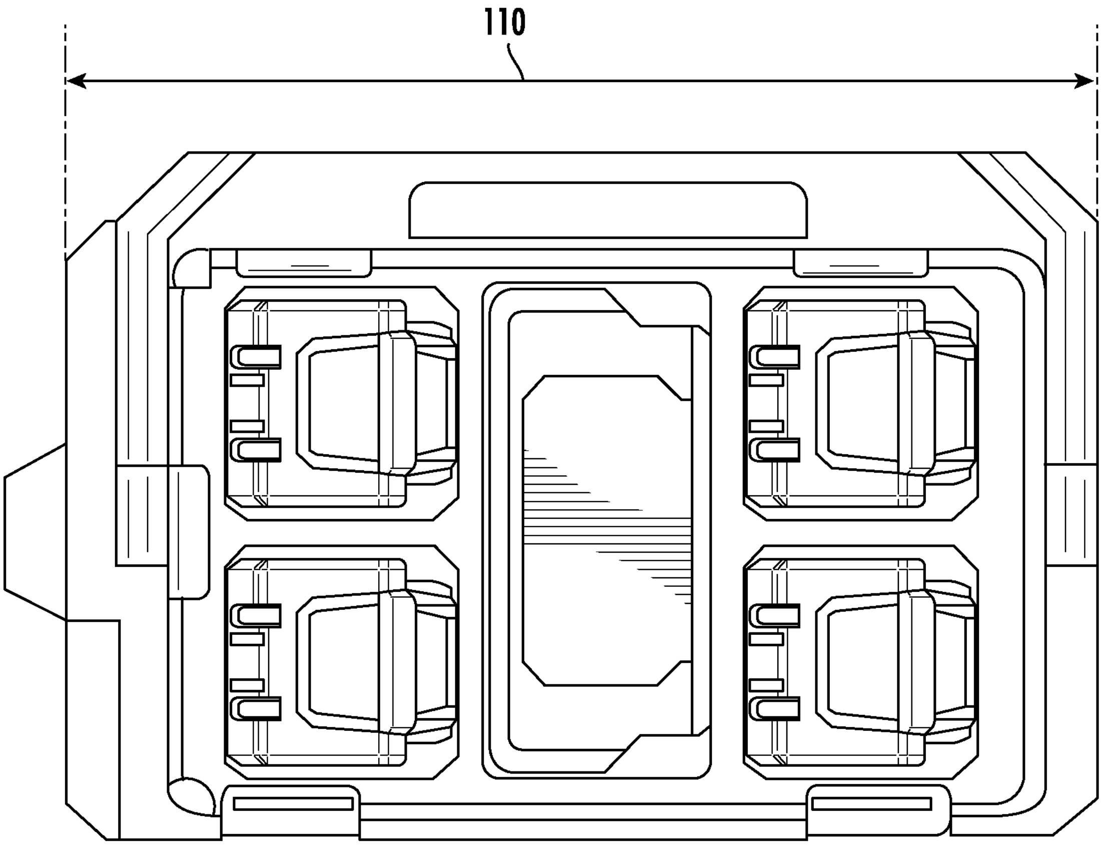
FIG. 25 is a side view of the vacuum of FIG. 1, according to an exemplary embodiment.

In various embodiments, recess 82 is configured to receive hose 26. In a specific embodiment vacuum 10 comprises four lateral walls 80, of which recess 82 is defined within first lateral wall 88, front wall 84, and second lateral wall 90. The fourth lateral wall 80, rear wall 86, does not define recess 82 (e.g., recess 82 does not extend through rear wall 86, in a specific embodiment). In a specific embodiment, recess 82 is defined within front wall 84. In a specific embodiment, recess 82 is defined within front wall 84 and first lateral wall 88. In a specific embodiment, recess 82 is defined within first lateral wall 88, and inlet 98 is defined within first lateral wall 88. As shown in subsequent figures, restricting hose 26 to at most three of lateral walls 80 in various embodiments permits hose 26 to be fully accessible even when vacuum 10 is placed next to another module storage unit (such as shown in FIGS. 21 and 22).

In various other embodiments, only one or two of lateral walls 80 include recess 82 within which ribs 64 are located. In various other embodiments, ribs 64 are not located within recess 82 and instead protrude outwardly from lateral walls 80.

Turning to FIGS. 19-22, various aspects of coupling vacuum 10 to other modular storage units are shown. In various embodiments, modular storage system 200 includes vacuum 10, one or more utility modules, shown as first modular storage device 74, and a utility module on the bottom, shown as base storage unit 72. Base storage unit 72 includes a second plurality of coupling mechanisms 152. One or more of second plurality of coupling mechanisms 152 are configured to detachably engage with first plurality of coupling mechanisms 142.

In one specific situation, vacuum 10 is coupled to a top 154 of base storage unit 72, such as for example plurality of coupling mechanisms 20 of vacuum 10 are coupled to a plurality of coupling mechanisms 152 extending from top 154 of storage unit 72, and a locking mechanism, shown as coupling lock 160, couples vacuum 10 to base storage unit 72. It is contemplated herein that coupling mechanisms 152 are compatible with the coupling mechanism(s) described in International Patent Application No. PCT/US2018/044629. Vacuum 10 has a depth 108 that is half of the depth 120 of base storage unit 72. This combination of dimensions of vacuum 10 and base storage unit 72 permits other utility modules, shown as modular storage devices 74, to couple to the top of base storage unit 72 adjacent to vacuum 10. In a specific configuration, rear wall 86 faces towards modular storage device 74 and/or a plurality of modular storage device 74 (shown FIG. 19).

One or more modular storage devices 74 are coupled to the other half of base storage unit 72. In a specific arrangement of devices, an additional base storage unit 72 is coupled to the top of vacuum 10 and the top of modular storage devices 74 shown in FIGS. 21 and 22.

Handle 16 is positionable in a first position 66 and a second position 68, permitting flexibility in the arrangement of vacuum 10 on base storage unit 72. When handle 16 is positioned in first position 66, hose 26 is on the side of vacuum 10 facing towards modular storage devices 74 so that end 132 of handle 16 extends past front wall 84 and does not interfere with modular storage devices 74 adjacent rear wall 86 coupling to base storage unit 72. When handle 16 is positioned in second position 68, end 132 of handle 16 extends past rear wall 86 and does not interfere with modular storage devices 74 adjacent front wall 84 coupling to base storage unit 72. As a result of the configuration shown in FIG. 19, hose 26 can be retrieved from the recess while vacuum 10 and modular storage device 74 are both coupled to a top of the base utility module 72. As another example, in FIG. 22 hose 26 is on the side of vacuum 10 facing away from modular storage devices 74, so handle 16 is rotated to second position 68 so that handle 16 does not interfere with modular storage devices 74 coupling to base storage unit 72.

Turning to FIGS. 21-25, in a specific embodiment, vacuum has a height 106 between 200 mm and 600 mm, and more particularly between 250 mm and 500 mm, and more particularly between 300 mm and 350 mm, and more specifically of 326 mm, a depth 108 between 100 mm and 400 mm, and more particularly between 150 mm and 350 mm, and more particularly between 200 mm and 300 mm, and more specifically of 247 mm, and a width 110 between 200 mm and 700 mm, and more particularly between 300 mm and 600 mm, and more particularly between 350 mm and 450 mm, and more specifically of 410 mm. Rear wall 86 of vacuum 10 is separated from front wall 84 by a first depth 108 in a first direction 92. Base storage unit 72 extends depth 120 in direction 92. In a specific embodiment, depth 120 of base storage unit 72 is at least twice depth 108 of vacuum 10.

In a specific of vacuum 10, the ratio of height 106 to depth 108 is between 1:1 and 1:2, and more particularly between 1:1.1 and 1:1.7, and more particularly between 1:1.2 and 1:1.5, and more specifically 1:1.32. In a specific embodiment of vacuum 10, the ratio of width 110 to height 106 is between 1:1 and 1:2, and more particularly between 1:1.1 and 1:1.7, and more particularly between 1:1.2 and 1:1.5, and more specifically 1:1.25. In a specific embodiment of vacuum 10, the ratio of width 110 to depth 108 is between 1:1 and 1:3, and more particularly between 1:1.25 and 1:2.5, and more particularly between 1:1.6 and 1:1.8 and more specifically 1:1.67.

The term 'utility module' as used herein in its broad meaning and is meant to denote a variety of articles such as, storage containers, travel luggage, tool boxes, organizers, compacted work benches, cable storage, tools (e.g. hand tools, power generators and power sources), communication modules, carrying platforms, locomotion platforms, etc., of any shape and size, and wherein any utility module can be detachably attached to any other utility module.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

We claim:

1. A modular storage system comprising:

a vacuum comprising:

a motor;

a hose;

a top panel;

a housing coupled to the top panel, the housing comprising:

a front wall;

a rear wall opposite the front wall, the rear wall separated from the front wall by a first depth in a first direction;

two sidewalls extending between the front wall and the rear wall, the two sidewalls positioned below the top panel and each comprising outward facing surfaces;

an internal compartment located within the housing;

an inlet through which debris enters the internal compartment when the motor is operating;

an outlet through which air exits the internal compartment when the motor is operating;

a recess defined by at least one of the two sidewalls, the recess comprising a laterally facing surface, the recess configured to receive the hose, wherein the laterally facing surface of the recess is recessed relative to the each of the outward facing surfaces of the two sidewalls;

a plurality of ribs protruding into the recess and positioned entirely within the recess such that the plurality of ribs are spaced from the outward facing surfaces of the two sidewalls, wherein the plurality of ribs are configured to receive the hose; and a first plurality of coupling mechanisms located along a bottom surface of the housing;

a first utility module comprising a second plurality of coupling mechanisms, one or more of the second plurality of coupling mechanisms configured to detachably engage with the first plurality of coupling mechanisms, the first utility module extending a second depth in the first direction that is at least twice the first depth.

2. The modular storage system of claim 1, the two sidewalls comprising a first lateral wall and a second lateral wall, the modular storage system further comprising a second utility module coupled to the first utility module, wherein the rear wall faces towards the second utility module.

3. The modular storage system of claim 2, the vacuum further comprising a handle pivotally coupled to the housing, the handle positionable in a first position in which an end of the handle extends past the front wall and a second position in which the end of the handle extends past the rear wall.

4. The modular storage system of claim 2, wherein the inlet of the vacuum extends through the first lateral wall.

5. The modular storage system of claim 4, wherein the hose is coupled to the inlet, and wherein the recess is further defined within the front wall.

6. The modular storage system of claim 5, wherein the recess is further defined within the first lateral wall and the second lateral wall.

7. The modular storage system of claim 5, wherein the hose can be retrieved from the recess while the vacuum and the second utility module are both coupled to a top of the first utility module.

8. The modular storage system of claim 1, wherein the laterally facing surface of the recess is a planar surface, and wherein the recess extends along the two sidewalls and around the internal compartment.

9. A vacuum comprising:

a motor;

a hose;

a housing comprising:

a bottom panel;

a top panel, the top panel comprising a plurality of coupling mechanisms configured to couple the vacuum to a first utility module;

an internal compartment located within the housing;

a first lateral wall extending upwards from the bottom panel, the first lateral wall positioned between the bottom panel and the top panel;

an inlet extending through the first lateral wall through which debris enters the internal compartment when the motor is operating; and a recess configured to receive the hose, the recess comprising a laterally facing surface, the recess is defined within and extends along an outward facing surface of the first lateral wall such that the laterally facing surface is recessed relative to the outward facing surface and positioned between portions of the outward facing surface of the first lateral wall; and an operating switch located on the first lateral wall, the operating switch configured to toggle whether the motor is operating.

10. The vacuum of claim 9, further comprising a locking mechanism coupled to the first lateral wall, the locking mechanism configured to couple the housing to a second utility module.

11. The vacuum of claim 9, the housing further comprising a plurality of ribs protruding into the recess, wherein the plurality of ribs are configured to receive the hose.

12. The vacuum of claim 9, wherein the hose is positionable entirely within the recess within the first lateral wall so that the hose does not extend past the first lateral wall.

13. The vacuum of claim 9, the housing further comprising:

a second lateral wall opposite the first lateral wall;

a front wall, the front wall extending from the first lateral wall to the second lateral wall; and wherein the recess extends through each of the front wall, the first lateral wall and the second lateral wall.

14. The vacuum of claim 13, the vacuum further comprising a handle pivotally coupled to the housing, the handle positionable in a first position in which an end of the handle extends past the front wall.

15. The vacuum of claim 9, wherein the operating switch faces outward and extends laterally from the first lateral wall.

16. A vacuum comprising:

a motor;

a hose;

a housing comprising:

a bottom panel;

a plurality of coupling mechanisms extending from the bottom panel and configured to couple the vacuum to a utility module;

a front wall extending upwards from the bottom panel;

a rear wall opposite the front wall and extending upwards from the bottom panel;

a first lateral wall that extends upward from the bottom panel and that extends from the front wall to the rear wall, the first lateral wall comprising a laterally facing outer surface;

a recess defined within and extending along the first lateral wall;

an internal compartment located within the housing;

an inlet through which debris enters the internal compartment when the motor is operating, the inlet extending through the first lateral wall and coupled to the hose; and an outlet through which air exits the internal compartment when the motor is operating;

a plurality of ribs positioned entirely within the recess, the plurality of ribs recessed relative to the laterally facing outer surface of the first lateral wall;

a handle pivotally coupled to the housing, the handle actuating between a first position and a second position, wherein when the handle is in the first position an end of the handle extends past the front wall, and when the handle is in the second position the end of the handle extends past the rear wall; and an operating switch located on the first lateral wall, the operating switch configured to toggle whether the motor is operating; and a locking mechanism coupled to the first lateral wall, the locking mechanism configured to couple the housing to the utility module.

17. The vacuum of claim 16, wherein the plurality of ribs extend laterally in the recess, the plurality of ribs configured to receive the hose.

18. The vacuum of claim 16, further comprising the recess defined within the front wall.

19. The vacuum of claim 18, wherein the rear wall does not define the recess.

20. The vacuum of claim 16, wherein the operating switch faces away from the internal compartment and extends laterally from the first lateral wall.

21. The vacuum of claim 16, further comprising a top panel pivotally coupled to the housing, wherein the recess is located between the top panel and the bottom panel.

* * * * *